Figure 1:
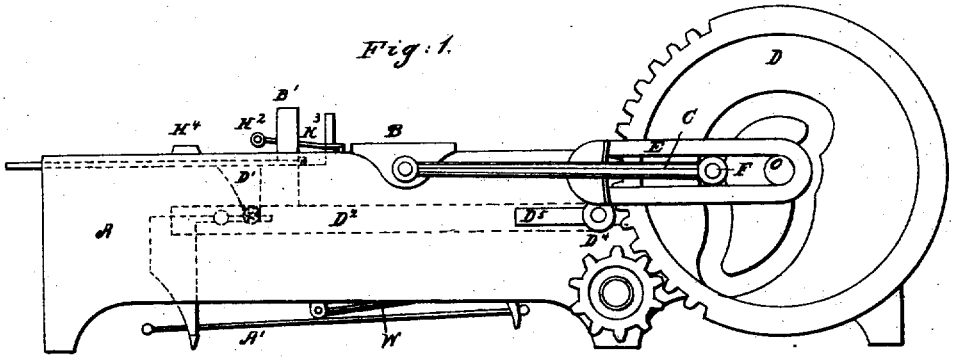
Figure 4:
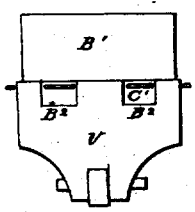
Figure 5:
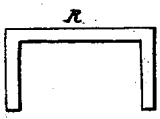
Figure 6:
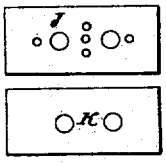

2 Sheets—Sheet 1.

J. SANGSTER.

Brick Machine.

No. 4,179.

Reissued Nov. 15, 1870.

Witnesses:

Edward Wilhelm.

Jno. J. Bonner.

Inventor:

James Sangster.

N. PETERS. Photo-Lithographer, Washington, D. C.

2. Sheets. Sheet. 2.
J. Slangster,
Brick Machine.
No. 4,179. Reissued Nov. 15. 1870.
Fig. II.
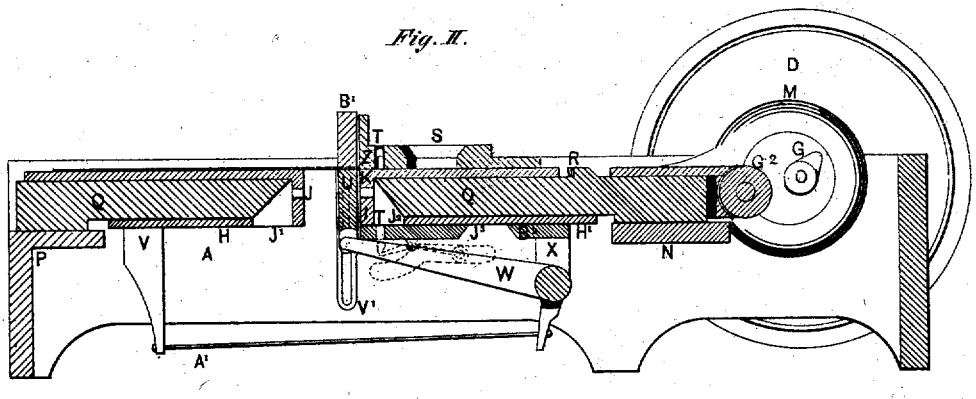
Fig. III.
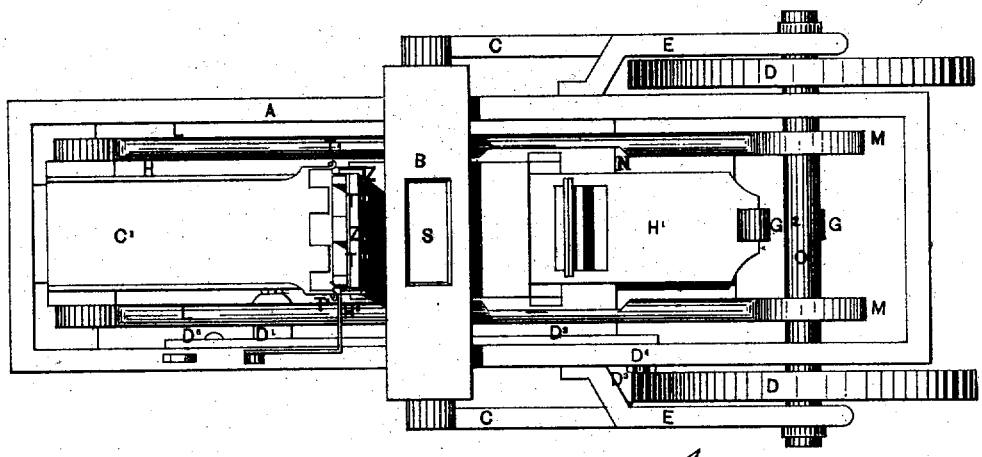
Edward Wilhelm
Jno. J. Bonner } Witnesses
James Slangster Inventor
N. PETERS, PHOTO-LITHOGRAPHER, WASHINGTON, D. C.

United States Patent Office.

JAMES SANGSTER, OF BUFFALO, NEW YORK.

Letters Patent No. 59,080, dated October 23, 1866; reissue No. 4,179, dated November 15, 1870.

DIVISION B.

IMPROVEMENT IN BRICK-MACHINES.

The Schedule referred to in these Letters Patent and making part of the same.

I, JAMES SANGSTER, of the city of Buffalo, in the county of Erie and State of New York, have invented an Improvement in Brick-Machines, of which the following is a specification.

*Nature and Object of the Invention.*

My invention relates to mechanism for receiving the bricks as they are expelled from the mold-boxes, and transferring them to a convenient point for their removal by the attendants; and It consists, in the combination with a mold-box arranged to deliver the bricks in a horizontal direction, of a vertically-moving forked follower and a horizontally moving deposit-table, in such a manner that the follower will rise to receive the brick at the instant it leaves the mold, and, by a succeeding downward movement, cross the plane of the table, while it is stationary, and deposit the brick thereon; and also that the table, by a succeeding movement will carry the brick laterally, so as to make room for the next deposit, the object being to continuously support the bricks in their delivery from the machine, so as to avoid breaking or injuring their angles

*Description of the Accompanying Drawing.*

Figure I is a side elevation of a machine embracing my improvement.

Figure II is a vertical longitudinal section of the same.

Figure III is a plan of the same.

Figure IV is a front view of the forked follower.

*General Description.*

A is the frame of the machine, made of cast-iron, rectangular in form, and strong and substantial.

B is the sliding mold-box, supported and guided by the sides of the main frame, and by the pistons.

O is the main driving-shaft, supported in suitable journal-boxes near one end of the main frame.

Each of its ends overhangs the frame, and carries a cam-wheel, D, by the operation of which the requisite motions are given to the sliding mold, said motions being communicated through the connecting-rods C.

H H′ are the pressing-pistons.

They are fitted upon the stationary guides Q, which are securely bolted to the cross-pieces N and P of the main frame.

The piston H is operated by eccentrics M on the main shaft, through the intervention of the connecting-rods L, and the piston H′ is operated by the cam G, also on the main shaft, acting on the friction-roller $G^2$, attached to one end of said piston.

The angular position of the eccentrics M and cam G on the shaft O is such as to cause the pistons to alternately approach and to recede from each other, while the relative position and shape of the cams D is such as to cause the mold-box B to move forward and bring its aperture S over the space between the pistons, when they are at their greatest distance apart, or shortly after the piston H begins its return movement.

When the parts are in this position the clay is introduced into the mold-box through the aperture S, and it then begins its return movement, moving faster than the piston H, which is also returning.

This return movement of the mold-box is continued until the space between the pistons is inclosed upon all sides, after which it remains stationary while the cam G moves the piston H′ toward the piston H, which movement is continued until the clay nearest the piston H′ is sufficiently condensed, or nearly so.

The cam G will have then passed the roller $G^2$, so that the piston H, which is still making its return movement, will force back the piston H′ until it strikes the fixed stop R, when the piston H will condense the clay upon its side to the same degree as that upon the side of the piston H′, and thus complete the pressing of the brick in the mold.

The piston H will now begin its forward movement, and relieve the pressure upon the brick, and, at the same time, the mold-box will resume its return movement, causing the piston H′, which is now stationary, to expel the brick from the mold-box. The mold-box will now remain stationary a short time, until the piston H completes its forward movement, when it will be again carried forward to the position first described.

This completes one evolution of the machine so far as the pressing of the brick is concerned, and will, of course, be repeated at each revolution of the main shaft.

U is the forked follower.

It is attached to the end of the long arm of a right-angle lever, W, and works in vertical guides V′.

The lever W is hinged to the pendent bracket $x$, bolted to the under side of the mold-box. The guides V′ are also bolted to the mold-box.

V is a pendent bracket, bolted to the under side of the piston H, and

A′ is a connecting-rod, leading from said bracket to the short arm of lever W. Owing to this connection the forward movement of the piston H, which is away from the mold-box, will cause the arm W to make an upward vibration, thereby raising the forked follower.

This forward motion of the piston begins with the expulsion of the brick from the mold, as before described, so that the follower is thereby made to rise at the proper time to receive and support the discharged brick upon its forked end, and as its motion continues, to lift the same above the piston H, as represented in Fig. III.

C′ is the deposit-table, placed upon the piston H, and made to slide longitudinally thereon toward the mold-box, first, by being connected with the mold-box by hooks and pins $T^4$ and $T^5$, and second, by means of the cam $D^3$ and connecting-bar $D^2$, the latter coming into action and continuing the movement of the table while the mold-box is at rest. The latter part of the movement of the table projects its end through the openings $B^2$ of the forked follower, and below the brick which has just been lifted by the follower. The table now remains stationary while the follower descends, so that it intercepts the brick and causes it to be deposited thereon, the change from the one support to the other being effected without any sliding or falling of the brick, thereby insuring against any breaking or crumbling of its corners.

The return movement of the table is effected by the forward movement of the mold-box. The next intercepting movement of the table will cause the brick already deposited thereon to be pushed back by contact with the second one lifted by the follower, so as to make room for the deposit of the latter.

The table may be of any desired length, so as to hold as many brick as the convenience of removal by the attendants may make desirable.

What I claim as my invention, is—

The combination, with the mold B of the forked follower U and deposit-table C′, arranged and operating so that the follower will cross the table in its downward movement and deposit the brick thereon, substantially as hereinbefore set forth.

JAMES SANGSTER.

Witnesses:
EDWARD WILHELM,
JNO. J. BONNER.